United States Patent
Smeets et al.

(10) Patent No.: US 8,752,361 B2
(45) Date of Patent: Jun. 17, 2014

(54) HYBRID ROPE

(75) Inventors: Paulus Johannes Hyacinthus Marie Smeets, Geulle (NL); Christiaan Henri Peter Dirks, Dilsen (BE); Lambertus Maria Jozef Tabor, Geleen (NL); Xavier Amils, Kortrijk (BE)

(73) Assignee: DMS IP Assets B.V., Heerlen (NL)

( * ) Notice: Subject to any disclaimer, the term of this patent is extended or adjusted under 35 U.S.C. 154(b) by 23 days.

(21) Appl. No.: 13/520,354

(22) PCT Filed: Jan. 5, 2011

(86) PCT No.: PCT/EP2011/050106
§ 371 (c)(1),
(2), (4) Date: Sep. 25, 2012

(87) PCT Pub. No.: WO2011/083126
PCT Pub. Date: Jul. 14, 2011

(65) Prior Publication Data
US 2013/0145739 A1 Jun. 13, 2013

(30) Foreign Application Priority Data
Jan. 7, 2010 (EP) .................................. 10150241

(51) Int. Cl.
*D07B 1/00* (2006.01)
(52) U.S. Cl.
USPC .................................. 57/200; 57/212; 57/222
(58) Field of Classification Search
USPC .......................................... 57/200, 212, 222
See application file for complete search history.

(56) References Cited

U.S. PATENT DOCUMENTS

| | | | | | |
|---|---|---|---|---|---|
| 1,577,003 | A | * | 3/1926 | Sunderland | 24/122.3 |
| 1,680,347 | A | * | 8/1928 | Sunderland | 403/275 |
| 2,689,389 | A | | 9/1954 | Sunderland | |
| 2,803,486 | A | * | 8/1957 | Larson et al. | 294/82.11 |
| 3,264,017 | A | | 8/1966 | Howe | |
| 3,409,951 | A | * | 11/1968 | Morieras | 24/122.6 |
| 3,507,949 | A | | 4/1970 | Campbell | |
| 4,043,690 | A | | 8/1977 | Browne | |
| 4,317,640 | A | * | 3/1982 | Peeling | 403/36 |
| 4,887,422 | A | * | 12/1989 | Klees et al. | 57/220 |
| 5,000,611 | A | * | 3/1991 | Reinhart | 403/265 |

(Continued)

FOREIGN PATENT DOCUMENTS

| | | |
|---|---|---|
| GB | 1 290 900 | 9/1972 |
| WO | WO 03/008702 | 1/2003 |
| WO | WO 2009/090411 | 7/2009 |

OTHER PUBLICATIONS

International Search Report for PCT/EP2011/050106, mailed Apr. 18, 2011.

*Primary Examiner* — Shaun R Hurley
(74) *Attorney, Agent, or Firm* — Nixon & Vanderhye P.C.

(57) ABSTRACT

Hybrid rope (1) having a core containing synthetic yarns (5), surrounded by an outer containing steel wire strands (5), the rope being terminated at least at one of its ends by a socket (2) having a conically shaped space (3), which has a conical angle α of between 2 and 8° and a length of between 5D and 20D, D being the smallest diameter of the conically shaped space, the core containing synthetic yarns and the steel wires having been untwisted at said at least one of the ends, the open space (6) around the untwisted wires and fibers in the hollow conical body of the socket being filled with a resin.

10 Claims, 2 Drawing Sheets

(56) References Cited

U.S. PATENT DOCUMENTS

Figure 1:
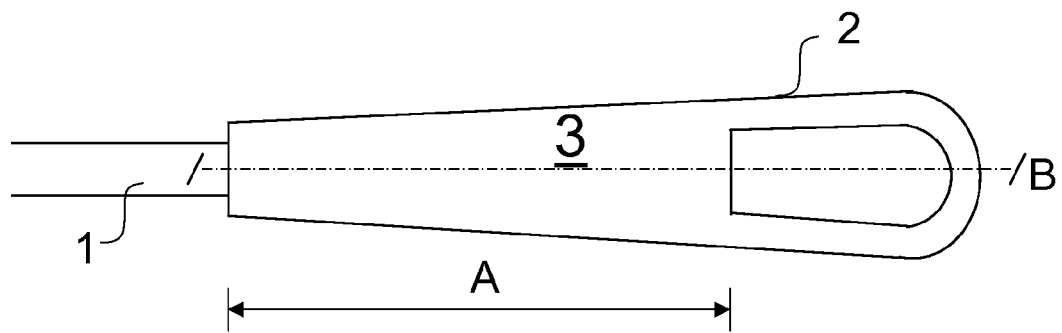

| | | | |
|---|---|---|---|
| 5,611,636 A * | 3/1997 | Flory | 403/269 |
| 5,904,438 A * | 5/1999 | Vaseghi et al. | 403/268 |
| 6,363,704 B2 * | 4/2002 | Kim | 57/216 |
| 8,327,506 B2 * | 12/2012 | Klein et al. | 24/122.6 |

* cited by examiner

HYBRID ROPE

This application is the U.S. national phase of International Application No. PCT/EP2011/050106 filed 5 Jan. 2011 which designated the U.S. and claims priority to EP Patent Application No. 10150241.7 filed 7 Jan. 2010, the entire contents of each of which are hereby incorporated by reference.

The invention relates to a hybrid rope having a core containing synthetic yarns, surrounded by an outer layer containing steel wire strands.

Hybrid ropes having a core containing synthetic yarns, surrounded by an outer layer containing for example helically laid outer steel wire strands are known. Hybrid ropes aim at combining the best of both worlds, the world of synthetic yarns and the world of steel wire strands. An advantage of the hybrid rope in view of a fully synthetic rope is that the rope is less sensible to mechanical disruptions. The rope is more resistant to wear and to attack by sharp objects. Furthermore the outer layer protects the synthetic yarns of the core against external influences, like for example UV and ozone attack and to high temperature radiation.

Hybrid ropes are for example described in GB-1290900, U.S. Pat. No. 4,887,422 and WO 2008/141623.

An advantage of the hybrid rope in view of a fully steel rope is the lower weight of the rope and improved performance like e.g. tension- and bending fatigue.

Hybrid ropes may for example be used in hoisting operations, for example as crane cables, in deep see installation, marine and off-shore mooring, commercial fishing, for example as warp lines for nets, and in mining operations.

For this reason it is necessary to properly terminate the rope, because via the rope termination tension in the rope is transferred to for example a hook on a crane block or an anchoring point of the rope or a shackle. One possibility of a rope termination is a spliced eye. For a lot of applications however sockets are preferred. This is because sockets take less space and it is easy to make all kind off connections with sockets. Also, spelter sockets (resin or molten zinc) yield 100% efficiency when assembled to ropes.

Ropes are normally terminated by a socket having a conically shaped space to receive a plug formed of the rope. The socket is placed on the rope at one or both of its ends with the large diameter of the conically shaped space pointing towards the end of the rope, yarns and wires of the hybrid rope are untwisted and spread at the rope end and a plug containing the untwisted yarns and wires is formed in the conically shaped space. The plug resists pull-out of the rope from the socket.

Many possibilities exist to form the plug. For fully steel ropes normally a socket having relatively short, wide angle conical body is used. The plug is formed by pouring a resin or a low melting metal in the socket, filling the open space around the untwisted wires in the conically shaped space of the socket. U.S. Pat. No. 3,507,949 for instance, describes a method of socketing ropes comprising strands of wire or natural or synthetic fibers or combinations thereof using a cold setting synthetic resin. However if conventional socket for steel ropes and conventional methods are used for the hybrid rope, the rope breaks already under a relatively low load.

For fully synthetic ropes very often the plug is formed by pushing a conical wedge, also sometimes referred to as spike or cone, in the center of the conically shaped space containing the untwisted yarns. Such a socket is for example described in GB-2313853. The socket provides a very strong end connection, because the plug of the yarns and the wedge is, if a tension is applied to the rope, pulled further in the socket, in this way increasing the friction between the yarns and the socket and gradually building up the tension forces in the rope. If applied to a hybrid rope, however, the problem of such a socket is that the connection with the socket to the hybrid rope is not strong enough, and especially after a long period of being used under load, the connection might fail.

Object of the invention is to provide a hybrid rope not showing these problems. This object is attained by a hybrid rope having a core containing synthetic yarns, surrounded by an outer layer containing steel wire strands, the rope being terminated at least at one of its ends by a socket having a conically shaped space, characterized in that the conically shaped space of the socket has a conical angle a of between 2 and 8° and a length A of between 5D and 20D, D being the smallest diameter of the conically shaped space, the core containing synthetic yarns and the steel wires having been untwisted at said at least one of the ends, the open space around the untwisted wires and core in the hollow conical body of the socket being filled with a resin.

According to the prior art practice of hybrid ropes, the synthetic yarns are cut and do not enter the socket. Only the steel wires are untwisted and surrounded by the resin. Hence in the prior art, only the steel wires contribute to the load inside the socket. In distinction herewith, according to the invention, the synthetic yarns are also untwisted and surrounded with the resin as is the case with the steel wires. So both the synthetic yarns and the steel wires add to the load inside the socket.

Because of the use of the special socket, the rope breaks at higher loads. Because of this a hybrid rope is obtained wherein the high strength of the synthetic yarns and the steel wires is better exploited. The socket is even that strong, that the rope is no longer pulled out of the socket or breaks at the socket outlet. The assembly of the hybrid rope with the socket works that well that the 100% breaking load of the hybrid rope is reached.

Although it is not per se excluded that the socket contains a wedge, preferably such a wedge is not present. This simplifies the process for applying the socket to the hybrid rope and surprisingly even without the wedge, the very high level of strength of the hybrid rope according to the invention is obtained.

The core containing synthetic yarns is preferably a rope made of synthetic yarns. The core may have any construction known for synthetic ropes. The core may have a plaited, a braided, a laid, a twisted or a parallel construction, or combinations thereof. Preferably the core has a laid or a braided construction, or a combination thereof.

In such rope constructions, the ropes are made up of strands. The strands are made up of rope yarns, which contain synthetic fibers. Methods of forming yarns from fiber, strands from yarn and ropes from strands are known in the art.

Strands themselves may also have a plaited, braided, laid, twisted or parallel construction, or a combination thereof.

For a further description of rope constructions, see for example "Handbook of fibre rope technology", McKenna, Hearle and O'Hear, 2004, ISBN 0-8493-2588-9.

An example of a braided rope construction is known from U.S. Pat. No. 5,901,632. In this patent publication a large-diameter braided rope is described, which rope contains primary strands that themselves have been braided, preferably from rope yarns containing high-strength polymeric filaments. In the most preferred embodiments indicated, the rope is a 12-strand, two-over/two-under circular braid, wherein each strand is itself a 12-strand braid made from high-modulus polyethylene (HMPE) filaments (12×12 construction).

A further example of a braided rope is a 12 strand braided hollow rope, also referred to as a 12×1 construction. Also for this construction, the above-mentioned handbook is referred to.

The core rope may further have a cover between the rope and the outer layer containing steel wire strands. The cover may be selected from a cover made of synthetic yarns, an extruded cover or a coating. A preferred cover is described in the co-pending application EP10165263.4.

The core containing synthetic yarns for the hybrid rope of the invention, can have any known thickness, depending on the ultimate use of the hybrid rope. Generally the core will have a diameter from 2 mm to 300 mm. Preferably the core has a diameter from 5 mm to 200 mm.

When "untwisting" is mentioned, it is meant that the core containing synthetic yarns is opened up, so that the constituting parts become loose. Untwisting thus also includes loosening the core, unbraiding the core or unwinding the core. If the core is a rope, this means that the rope can be opened to obtain loose strands, but also that the strands can be further opened to obtain loose yarns, or even loose fibers or filaments.

The core of synthetic yarn and the outer steel wires are preferably untwisted over the entire length A of the socket. In some cases the core of synthetic yarn and the outer steel wires can be untwisted over a slightly larger distance, preferably a length A+D.

In general, first the steel wire strands are untwisted over such a length that the strands will enter the socket in a parallel configuration. This allows to optimize strength at the socket entrance.

Then, generally in a next step, the core containing synthetic yarns is untwisted. The level of untwisting depends generally on the thickness of the core. Thus, for example for a relatively thick core, e.g. having a diameter from 50 mm to 200 mm, the core is untwisted to obtain loose strands. For thinner cores, e.g. having a diameter smaller than 50 mm, in particular smaller than 20 mm, the core can be untwisted to obtain loose yarns, or even fibers.

In some cases an extruded cover may be present on the core containing synthetic strands. In such a case, this extruded cover is preferably removed before untwisting the synthetic fibers and the steel wires.

Synthetic yarns that may be used in the core of the hybrid rope according to the invention include all yarns, which are known for their use in fully synthetic ropes. Such yarns may include yarns made of fibers of polypropylene, nylon, polyester. Preferably yarns of high modulus fibers are used, such as for example yarns of fibers of liquid crystal polymer (LCP), aramid, high molecular weight polyethylene (HMwPE), ultra-high molecular weight polyethylene (UHMwPE), PBO (poly(p-phenylene-2,6-benzobisoxazole) and mixtures thereof. The high modulus fibers preferably have a tensile modulus of at least 2 MPa. Preferably the core contains at least 60 wt. % based on the total weight of the core of yarns of high modulus fibers, more preferably at least 70 wt. %, most preferably at least 80 wt. %.

By fiber is herein understood an elongate body, the length dimension of which is much greater that the transverse dimensions of width and thickness. Accordingly, the term fiber includes filament, ribbon, strip, band, tape, and the like having regular or irregular cross-sections. The fibers may have continuous lengths, known in the art as filaments, or discontinuous lengths, known in the art as staple fibers. Staple fibers are commonly obtained by cutting or stretch-breaking filaments. A yarn for the purpose of the invention is an elongated body containing many fibers.

Best results are obtained if a yarn of gel spun fibers of high or ultra high molecular weight polyolefin, preferably HMwPE or UHMwPE yarns are used in the core of the rope.

It is preferred that the core contains at least 60 wt %, based of the total weight of the core, of HMPE yarns. More preferably the core contains at least 70 wt. % of even at least 80 wt. % HMPE yarns. The remaining weight of the core may consist of yarns manufactured from other polymers as enumerated hereinabove.

The gel spinning process is described in for example GB-A-2042414, GB-A-2051667, EP 0205960 A and WO 01/73173 A1. This process essentially comprises the preparation of a solution of a polyolefin of high intrinsic viscosity, spinning the solution to filaments at a temperature above the dissolving temperature, cooling down the filaments below the gelling temperature so that gelling occurs and drawing the filaments before, during or after removal of the solvent.

The shape of the cross-section of the filaments may be selected here through selection of the shape of the spinning aperture.

Preferably HMwPE is used with an intrinsic viscosity of at least 5 dl/g, determined in decalin at 135° C., and a yarn titre of at least 50 denier, with the yarn having a tensile strength of at least 25, more preferably at least 30, even more preferably at least 32, even more preferably at least 34 cN/dtex and a tensile modulus of at least 1000 cN/dtex.

The intrinsic viscosity is determined according to PTC-179 (Hercules Inc. Rev. Apr. 29, 1982) at 135° C., the dissolution time being 16 hours, the anti-oxidant is DPBC, in an amount of 2 g/l solution, and the viscosity is measured at different and is extrapolated to zero concentration.

The outer layer of the rope may contain any steel wire known for producing steel ropes may be used. Preferably, the steel wires are plain high-carbon steel wires. A high-carbon steel may have a composition along following lines: a carbon content ranging from 0.30% to 1.15%, preferably between 0.40% and 0.90%, a manganese content ranging from 0.10% and 1.10%, a silicon content ranging from 0.10% to 0.90%, the sulfur and phosphorous contents being limited to 0.15%, preferably to 0.10% or even lower. Additional micro-alloying elements such as chromium (up to 0.20%-0.40%), copper (up to 0.20%) and vanadium (up to 0.30%) may be added. All percentages are percentages by weight.

The individual steel wires may or may not be coated with a coating such as a corrosion resistant coating, e.g. a zinc coating or a zinc aluminum coating, or a zinc aluminum magnesium coating.

The individual steel wires are twisted into several strands. Dependent upon the final application, the diameter of the individual steel wires may vary between 0.30 mm and 7.0 mm.

Preferably the outer layer of the rope contains one layer of helically laid steel wire strands around the core, but two layers of steel strands are not excluded.

It is possible that the outer layer of the rope contains more than one layer of strands that are helically laid around the core. Preferably such layers are twisted in opposite direction from the adjacent layer or layers.

The invention is particularly suitable for hybrid ropes of all diameters. For hoisting operations preferably rope of a diameter between 10 and 60 mm is used. For deep see installation and marine and off shore mooring the diameter preferably is between 40 and 200 mm.

For the socket many constructions are possible, for example depending on the use of the rope, as long as the socket has the conically shaped space. The socket may comprise all kind of parts to transfer loads from the hybrid rope.

Sockets may for example be open or closed sockets. In general, these sockets are made of steel. The conically shaped space of the socket has the shape of a truncated cone. Ways to obtain such sockets are known to a person skilled in the art.

The conical angle α of the conically shaped space is the angle between the axis of the cone formed by the conically shaped space and the intersection line between a plane through that axis and the wall surrounding the conically shaped space. The aperture therefore is 2α.

Preferably length A is greater than 5.5D, more preferably greater than 6D, more preferably greater than 6.5D, more preferably greater than 7D. Preferably length A is smaller than 20D, more preferably smaller than 18D, more preferably smaller than 16D, more preferably smaller than 14D, more preferably smaller than 12D, more preferably smaller than 10D.

Preferably a is smaller than 6°, more preferably smaller than 5°. Preferably a is larger than 2°.

D is generally from 1.05 to 2 times, preferably from 1.05 to 1.25 times the diameter of the rope.

Resins used to fill the open spaces between the fibers and the wires in the hollow body, to form the plug, are well known in the art and is often indicated as potting resin. Potting resins may be based on unsaturated polyester, polyurethane and epoxy resins. In the choice of the resin care must preferably be taken that the curing temperature of the resin is sufficiently low so that loss of performance of synthetic yarns is prevented.

In the choice of the resin, care must preferably be taken that the curing temperature of the resin is sufficiently low so that transformation of high-modulus synthetic yarns into low-modulus synthetic yarns is prevented.

A further object of the invention is a process for terminating a hybrid rope having a core containing synthetic yarns, surrounded by an outer layer containing steel wire strands, which process comprises the steps of placing a socket having a conically shaped space over at least one of the ends of the rope, wherein the conically shaped space of the socket has a conical angle a of between 2 and 8° and a length A of between 5D and 20D, D being the smallest diameter of the conically shaped space, untwisting the core containing synthetic yarns and the steel wires at said at least one of the ends, filling the open space around the untwisted wires and fibers in the hollow conical body of the socket with a resin.

After untwisting the core containing synthetic yarns and steel wires, the obtained yarns and wires are preferably be spread into the shape of the socket.

The step of filling the open space with a resin can be followed by a step where the resin is cured.

Figure 2:
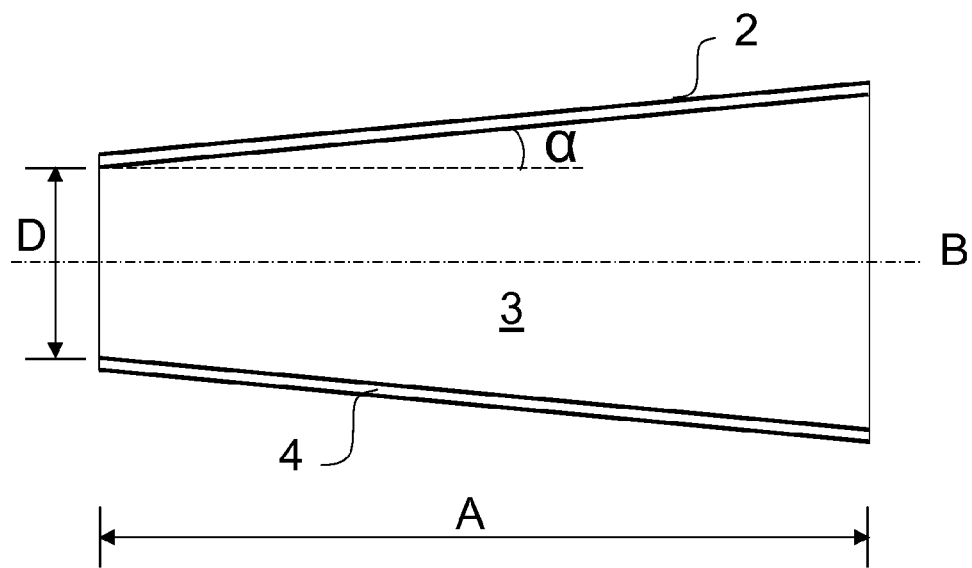
Figure 3:
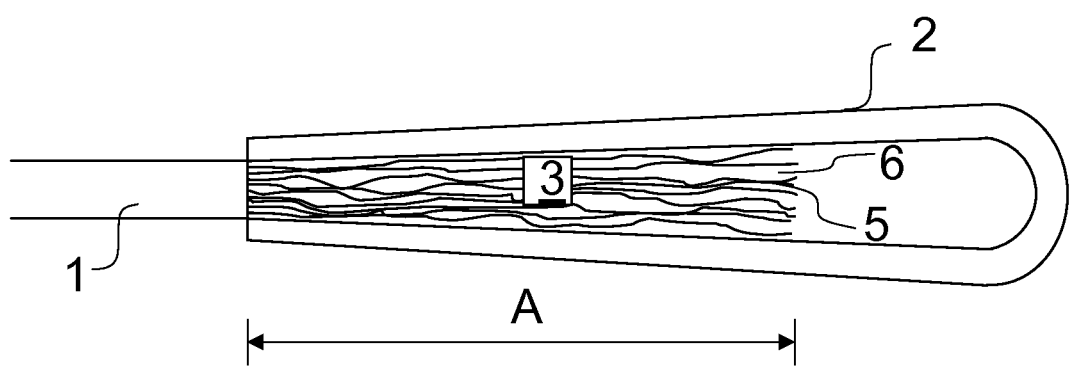

The invention is further explained by the FIGS. 1 to 3.

In FIG. 1 a hybrid rope and a socket according to the invention are shown in side view.

In FIG. 2 an intersection of a socket of the invention is shown having the conically shaped space.

In FIG. 3, the same hybrid rope of FIG. 1 is shown, however now in longitudinal intersection.

In FIG. 1 a socket according to the invention is shown in side view. The rope 1 is connected to the socket 2. The conically shaped space 3 has a length indicated by A.

In FIG. 2 an intersection of a socket 2, showing the conically shaped space 3 is given in a plane that runs through the axis B of that space (also in FIG. 1). It is clear that the conically shaped space is truncated. The angle of conically shaped space a and the length of that space A are presented in FIG. 2. D is the smallest diameter of the conically shaped space. The conically shaped space is determined by the socket wall 4.

In FIG. 3 the rope of FIG. 1 is shown, however now in longitudinal intersection. The rope 1 is connected to the socket 2 in the conically shaped space 3, which contains the untwisted core and steel wires of the rope 5. The open space 6 around the fibers and wires is filled with a potting resin.

EXAMPLES

The following hybrid ropes were produced, by using standard equipment.

Example 1

Hybrid Rope (Invention)

First a 12 strand braided core of synthetic yarn was produced, each strand consisting of 14*1760 dTex Dyneema® 1760 dTex SK78 yarn. The diameter of the core is 8 mm.

The hybrid rope is thereafter obtained by first twisting eight strands of each 19 bright, i.e. non coated steel wires and compacting them and thereafter laying these eight compacted strands around the braided core, which forms thereafter the core of the hybrid rope. The tensile strength of the steel wires is 1960 MPa. The final diameter of the hybrid rope is 13 mm.

Example 2

Steel/Sisal Rope (Comparative)

A rope was made as in Example 1, with the exception that the core is a rope made of 4 strands of sisal. The diameter of the core is 8 mm. The final diameter of the steel/sisal rope is 13 mm.

Example 3

Steel/Steel Rope (Comparative)

A rope was made as in Example 1, with the exception that the core was made of steel wire and had a 7×7 construction with a diameter of 6.7 mm.

The following sockets were provided:

Socket A

Socket 1 is normally used for fully steel wire ropes. The conically shaped space of the socket has the following dimensions:

A=4.4D (D is diameter of the rope)
α=6.3°

Socket B

Socket 2 was especially produced for the purpose of the experiments. The conically shaped space of the socket has the following dimensions:

A=8.8D
α=2° 30'

Process For Connection of Sockets to the Ropes.

Both ends of the ropes were terminated with the socket 1 or socket 2. For this the end of the rope was put through the small diameter opening of the socket. Then the rope and the strands of the rope were cleaned and untwisted over a distance of A+D. Thereafter the wires and yarns of the rope were spread into the shape of the hollow conically shaped space of the socket. The untwisted and spread end of the rope was thereafter pulled into the conically shaped space. The socket containing the untwisted and spread end of the rope was placed in a vertical position, with the wide opening of the conically shaped space of the socket pointing in upward direction.

After that an unsaturated polyester two component resin Socket Fast Blue™, delivered by Phillistran was mixed and poured into the socket, to fill the open spaces between the yarns and wires of the unraveled and spread rope end. The resin was allowed to cure for a period of 24 hours.

The length of the ropes was 4 m.

Testing of the Ropes.

The ropes were tested according to ISO 2307.The ropes were attached by their sockets to a standard rope break test equipment. The ropes were pretensioned 5 times to about 50% of their expected breaking strength, which was 7 tons.

Thereafter the ropes were tensioned until breaking. The breaking strength of the ropes is reported in table 1. As a reference the same ropes were tested, using he same procedure, however now without a socket, but by attaching the ropes to the test equipment by clamping. Also the strength measured in this way is reported in the table 1 (row "breaking strength clamped").

TABLE 1

| Example | Socket | Breaking strength with socket (metric tons) | Breaking strength clamped (metric tons) |
|---|---|---|---|
| 1 (steel/synthetic) | A (comparative) | 10.8 | 14.8 |
| 1 (steel/synthetic) | B (invention) | 14.8 | 14.8 |
| 2 (steel/sisal) | A | 9.4 | 11.5 |
| 2 (steel/sisal) | B | 8.9 | 11.5 |
| 3 (steel/steel) | A | 13.1 | 13.6 |
| 3 (steel/steel) | B | 12.7 | 13.6 |

From the results in Table 1 it is clear that the hybrid rope according to the invention (Example 1B) shows an improved efficiency at its end. The breaking load of the assembly of the hybrid rope with the socket reaches the 100% breaking load of the hybrid rope as such, as measured in clamps. The assembly of the rope with the socket having the socket known for full metal ropes (Example 1A, not according to the invention) shows on the contrary a breaking load that is lower than the breaking load of the same rope measured while it is clamped to the testing equipment.

Moreover, it can be seen that switching the socket for other types of ropes, i.e. steel with a sisal core or steel with a steel core, does not result in a significantly different breaking strength of the rope.

The invention claimed is:

1. A hybrid rope having a core containing synthetic yarns, surrounded by an outer layer containing steel wire strands, wherein the rope is terminated at least at one end thereof by a socket having a conically shaped space, and wherein the conically shaped space of the socket has a conical angle α of between 2 and 8° and a length A of between 5D and 20D, wherein D is a smallest diameter of the conically shaped space, and wherein the synthetic yarns of the core and the steel wire strands are untwisted at said at least one end thereof, and wherein the conically shaped space in the hollow conical body of the socket around the untwisted synthetic yarns of the core and the steel wire strands at said at least one end thereof is filled with a resin.

2. The hybrid rope according to claim 1, wherein the synthetic yarns are monofilament yarns of liquid crystal polymer (LCP), aramid, high molecular weight polyethylene (HMwPE), ultra-high molecular weight polyethylene (UHMwPE) or PBO (poly(p-phenylene-2,6-benzobisoxazole).

3. The hybrid rope according to claim 1, wherein the synthetic yarns comprise yarns of gel spun high-molecular weight polyethylene.

4. The hybrid rope according to claim 1, wherein the core containing synthetic yarns and the steel wire strands are untwisted over a length A or a length A+D.

5. The hybrid rope according to claim 1, wherein α is between 2 and 6°.

6. The hybrid rope according to claim 1, wherein α is between 2 and 5°.

7. The hybrid rope according to claim 1, wherein A is smaller than 18D.

8. The hybrid rope according to claim 1, wherein A is smaller than 16D.

9. The hybrid rope according to claim 1, wherein A is smaller than 14D.

10. A process for terminating a hybrid rope having a core containing synthetic yarns, surrounded by an outer layer containing steel wire strands, comprising the steps of:

(a) placing a socket having a conically shaped space over at least one end of the rope, wherein the conically shaped space of the socket has a conical angle α of between 2 and 8° and a length A of between 5 D and 20D, and wherein D is a smallest diameter of the conically shaped space, (b) untwisting the core containing synthetic yarns and the steel wire strands at said at least one end thereof, and (c) filling the conically shaped space in the hollow conical body of the socket around the untwisted synthetic yarns and wire strands with a resin.

* * * * *

UNITED STATES PATENT AND TRADEMARK OFFICE
CERTIFICATE OF CORRECTION

PATENT NO. : 8,752,361 B2  Page 1 of 1
APPLICATION NO. : 13/520354
DATED : June 17, 2014
INVENTOR(S) : Smeets et al.

It is certified that error appears in the above-identified patent and that said Letters Patent is hereby corrected as shown below:

Title page, item (73) Assignee: should read DSM IP Assets B.V., Heerlen (NL)

NV Bekaert S.A., Zwevegem (BE)

Signed and Sealed this
Fifteenth Day of September, 2015

Michelle K. Lee
*Director of the United States Patent and Trademark Office*